United States Patent
Guisasola et al.

(10) Patent No.: US 11,926,026 B2
(45) Date of Patent: Mar. 12, 2024

(54) DEVICE FOR TENSIONING A CONNECTING ELEMENT

(71) Applicant: Caterpillar Energy Solutions GmbH, Mannheim (DE)

(72) Inventors: Inigo Guisasola, Landau (DE); Daniela Ehlers, Mannheim (DE); Michael Weitzel, Mannheim (DE)

(73) Assignee: Caterpillar Energy Solutions GmbH, Mannheim (DE)

( * ) Notice: Subject to any disclaimer, the term of this patent is extended or adjusted under 35 U.S.C. 154(b) by 444 days.

(21) Appl. No.: 17/416,932

(22) PCT Filed: Dec. 20, 2019

(86) PCT No.: PCT/EP2019/025474
§ 371 (c)(1),
(2) Date: Jun. 21, 2021

(87) PCT Pub. No.: WO2020/126097
PCT Pub. Date: Jun. 25, 2020

(65) Prior Publication Data
US 2022/0080570 A1    Mar. 17, 2022

(30) Foreign Application Priority Data
Dec. 21, 2018 (GB) ...................... 1821012

(51) Int. Cl.
*B25B 29/02* (2006.01)
*F16B 31/04* (2006.01)
(52) U.S. Cl.
CPC ............ *B25B 29/02* (2013.01); *F16B 31/043* (2013.01)

(58) Field of Classification Search
CPC ......... B25B 29/02; F16B 31/043; B23P 19/06
See application file for complete search history.

(56) References Cited

U.S. PATENT DOCUMENTS 7,275,462 B2   10/2007   Faus et al.
8,403,781 B2   3/2013   Perissinotto
(Continued)

FOREIGN PATENT DOCUMENTS

| EP | 3323555 A1 | 5/2018 |
|---|---|---|
| SU | 1256949 A1 | 9/1986 |
| WO | 8200851 A1 | 3/1982 |

OTHER PUBLICATIONS

International Search Report related to Application No. PCT/EP2019/025474; dated Mar. 27, 2020.
(Continued)

*Primary Examiner* — David B. Thomas

(57) ABSTRACT

The present invention refers to a device for tensioning a connecting element fastened to a component to be tightened, which comprises a fixation element for receiving and holding the connecting element; a support element for supporting the device against the component; and an actuating unit with a fluid chamber for receiving a fluid and a piston which is translationally guided in the fixation element. The actuating unit is configured for manipulating a volume of the fluid chamber by translationally actuating the piston so as to move the fixation element relative to the support element. Further, the device comprises a guiding unit for locking a relative rotational movement between the piston and the fixation element, wherein the guiding unit is arranged outside of the fluid chamber.

14 Claims, 5 Drawing Sheets

(56) References Cited

U.S. PATENT DOCUMENTS

| | | |
|---|---|---|
| 8,857,032 B2 | 10/2014 | Bowie et al. |
| 8,950,292 B2 | 2/2015 | Declerck et al. |
| 9,188,146 B1 | 11/2015 | Trautman et al. |
| 9,878,430 B2 * | 1/2018 | Hohmann ............... B25B 29/02 |
| 11,207,767 B2 * | 12/2021 | Guisasola ............... B25B 29/02 |

OTHER PUBLICATIONS

Great Britain Search Report related to Application No. 1821012.0; dated Jun. 4, 2019.

* cited by examiner

DEVICE FOR TENSIONING A CONNECTING ELEMENT

CROSS-REFERENCE TO RELATED APPLICATION

This Application is a 35 USC § 371 US National Stage filing of International Application No, PCT/EP2019/025474 filed on Dec. 20, 2019 which claims priority under the Paris Convention to Great Britain Patent Application No. 1821012.0 filed on Dec. 21, 2018.

TECHNICAL FIELD

The present invention refers to a device for tensioning and/or loosening a tensable connecting element, such as a screw connection, fastened to a component to be tightened or loosened.

TECHNOLOGICAL BACKGROUND

Tensable connecting elements, such as tensable screw connections, for tightening or connecting components are well known. Specifically, for installing such tensable connecting elements, the use of screw tensioning devices is known, for example, in the field of steel constructions and various engine design applications. These screw tensioning devices generally operate based on a torque-free tensioning method, according to which pulling forces are used to lengthen large screws or bolts in an elastic range during installation such that, upon releasing the pulling forces, the connecting elements retract and thereby apply tensional forces onto the components to be tightened.

For example, in a known use of the screw tensioning devices, at first, a first end of a screw is connected to a first component via a threaded means. Then, a second component to be fastened to the first component is provided such that a threaded rod of the screw extends therethrough. Via a second end of the screw, a nut is placed on the screw so as to be engaged with the threaded rod. Thereafter, the second end of the screw is engaged with the screw tensioning device and a pulling force is applied thereto so as to elastically lengthen the screw. In this lengthened state, the nut is further tightened such that, upon releasing the pulling force applied to the screw, the screw together with the nut apply a tensional force for frictional connecting the first to the second component.

Such a screw tensioning device, for example, is known from EP 323 555 A1. In the known device, hydraulically induced pulling forces are used for tensioning a screw connecting element engaged with a fixation element of the device. Specifically, the known device comprises a support element configured to support the fixation element against a component to be tightened during tensioning operation. The fixation element is arranged to be movable relative to the support element so as to apply tension or to remove tension from the screw. Further, a piston is provided which is accommodated and movable within the fixation element along a longitudinal axis of the device. For hydraulically actuating the fixation element, a hydraulic chamber containing a fluid is delimited by and provided in a space between the piston, the fixation element and the support element. In this configuration, the piston is arranged such that a translational movement thereof relative to the fixation element manipulates a volume of the fluid chamber and thereby translationally actuates the fixation element relative to the support element.

Specifically, the fluid chamber comprises two distinct portions, a piston portion delimited by and provided between the piston and the fixation element and an effective portion delimited by and provided between the fixation element and the support element which are fluid-communicatively connected via two connecting bores provided in the fixation element. In this configuration, the effective portion is disposed around the fixation element along a circumferential direction thereof and has an effective base area that is considerably larger compared to an effective base area of the piston portion. The actuating force applied onto the piston is hydraulically transformed into a force acting on the fixation element which is higher compared to that one acting on the piston. By this configuration, an actuating force acting on the piston is transformed into a higher pulling force acting on the screw. In this way, the pulling force for tensioning the screw is generated by multiplying the actuating force applied to the piston.

For actuating the piston, the known device is equipped with an actuator assembly including an actuator element connected to an end portion of the piston by means of a threaded engagement such that a rotational movement of the actuating element is transferred into a translational movement of the piston relative to the fixation element. In order to prevent the piston from rotational movement relative to the fixation element, the device further comprises a guide structure accommodated within the hydraulic chamber.

SUMMARY OF THE INVENTION

In view of the prior at, it is an objective to provide an improved device for tensioning a connecting element. An additional object may be to provide a device with a high operational safety and with an increased maintainability.

This object is solved by means of a device for tensioning a connecting element having the technical features of claim 1. Preferred embodiments are set forth in the present specification, the Figures as well as the dependent claims.

Accordingly, a device is provided for tensioning a connecting element fastened to a component to be tightened which comprises a fixation element for receiving and holding the connecting element; a support element for supporting the device against the component to be tightened; and an actuating unit having a fluid chamber for receiving a fluid and a piston which is translationally guided in the fixation element. The actuating unit is configured for manipulating a volume of the fluid chamber by translationally actuating the piston, i.e. relative to the fixation element, so as to move the fixation element relative to the support element. The device further comprises a guiding unit for locking a relative rotational movement between the piston and the fixation element, wherein the guiding unit is arranged outside of the fluid chamber.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
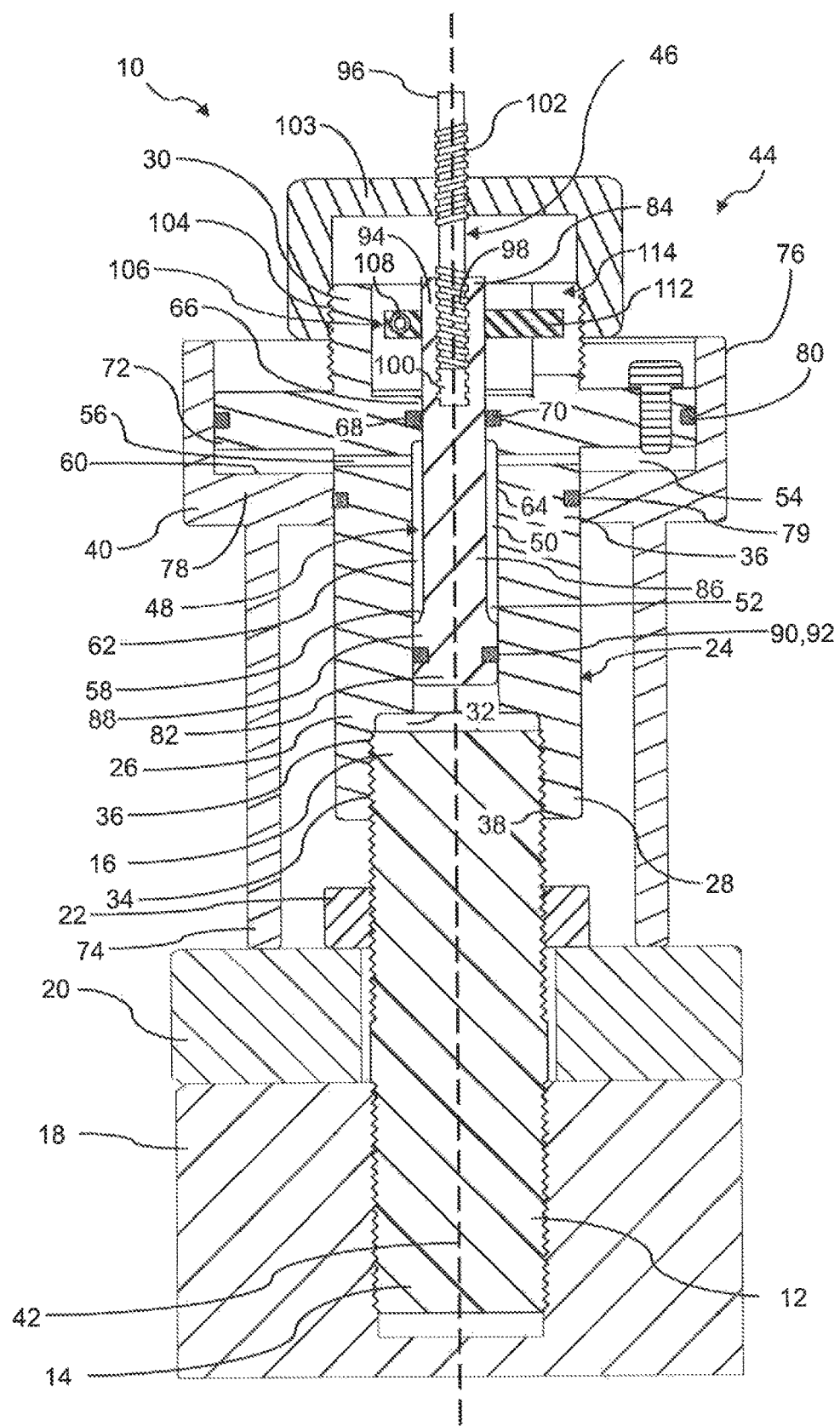
FIG. 1 schematically shows a sectional view of a device for tensioning a connecting element, FIG. 2 schematically shows an enlarged view of a guiding unit of the device depicted in FIG. 1.

In the following, the invention will be explained in more detail with reference to the accompanying Figures. In the Figures, like elements are denoted by identical reference numerals and repeated description thereof may be omitted in order to avoid redundancies.

FIG. 1 schematically shows a device 10 for tensioning a connecting element 12 which forms a screw connection. The shown device 10 may be used for tensioning, i.e. preloading, and/or loosening, i.e. untighten, tensable screw connections. In the context of the present disclosure, the term "tensable" refers to a material property indicating that a component, i.e. the connecting element 12, at least partially, is capable of being elastically expanded and thus of storing an amount of elastic energy when being subjected to a tensioning force.

Specifically, the connecting element 12 is provided in the form of a screw comprising a first end 14, an opposed second end 16 and an elastic part positioned between the first end 14 and the second end 16. The elastic part is capable of being elastically lengthened when the connecting element 12 is subjected to a pulling force by means of the device 10.

The connecting element 12 is configured for connecting, i.e. for form- and/or force-fittingly connecting, a first component 18 to a second component 20. Specifically, the first end 14 of the connecting element 12 is configured to be connected to the first component 18 by means of a threaded engagement, as depicted in FIG. 1. The elastic part of the connecting element 12 extends through the second component 20 such that the second end 16 of the connecting element 12 is positioned on a side of the second component 20 facing away from the first component 18. For connecting the first and the second component 18, 20, a nut 22 is provided which is in threaded engagement with the elastic part of the connecting element 12.

The device 10 comprises a fixation element 24 connectable the connecting element 12. Specifically, the fixation element 24 includes a cylindrical portion 26 having a first end 28 and a second end 30. At the first end 28, the fixation element 24 is provided with a fixation section for receiving and holding the connecting element 12, i.e. the second end 16 thereof. In other words, the fixation section is provided for engaging with the connecting element 12 in a force- and/or form-fitting manner. Specifically, the fixation section includes a cylindrical recess 32 to house the second end 16 of the connecting element 12 and internal threads 34 formed on a side wall 36 of the recess 32 to engage with complementary threads 38 formed at the second end 16 of the connecting element 12.

Further, the device 10 comprises a support element 40 configured to support the device 10 against the second component 20 and to translationally guide the fixation element 24 relative to the first and second component 18, 20. In other words, the fixation element 24 is translationally movable relative to the support element 40, i.e. along a longitudinal axis 42 of the device. Specifically, upon translationally moving the fixation element 24 relative to the support element 40, a tensioning force may be applied to or may be removed from the connecting element 12 fixed to the fixation element 24.

The device 10 further comprises an actuating unit 44 for translating a rotational movement applied to an actuating element 46 into a translational movement of the fixation element 24 relative to the first and second component 18, 20 to be tightened and thus relative to the support element 40. In other words, the actuating unit 44 is provided so as to actuate the fixation element 24 relative to the support element 40. In the following, the structure and operation of the actuating unit 44 will be explained in more detail.

The actuating unit 44 is at least partly hydraulically actuated. In other words, a hydraulic fluid is used to transfer motive power so as to move the fixation element 24 relative to the support element 40. Specifically, the actuating unit 44 comprises a fluid chamber 50 accommodating the fluid, wherein the actuating unit 44 is configured to manipulate a volume of the fluid chamber 50 so as to move the fixation element 24 relative to the support element 40. For doing so, the actuating unit 44 is provided with a piston 48 accommodated within and movable relative to the fixation element 24, i.e. along the longitudinal axis 42. In the shown configuration, the fluid chamber 50 is delimited by the piston 48, the fixation element 24 and the support element 40.

The actuating unit 44 is designed such that a translational movement of the piston 48 manipulates the volume of the fluid chamber 50 and thereby moves the fixation element 24 with respect to the support element 40 so as to apply or remove a tension acting on the connecting element 12 connected to the fixation element 24.

More specifically, the fluid chamber 50 comprises two distinct portions, a piston portion 52 delimited by and provided between the piston 48 and the fixation element 24 and an effective portion 54 delimited by and provided between the fixation element 24 and the support element 40. The piston portion 52 and the effective portion 54 are fluid-communicatively connected via two connecting bores 56 provided in the fixation element 24. A base area 58 of the piston portion 52 is provided with an effective cross section that is smaller than an effective cross section of a base area 60 of the effective portion 54. In this context, the "effective cross section" refers to an area that is perpendicular to the longitudinal direction 42 and thus perpendicular to a moving direction of both the piston 48 and the fixation element 24 relative to the support element 40. By this configuration, an actuating force applied onto the piston 48 is hydraulically transformed into a force acting on the fixation element 24 that is higher compared to the actuating force acting on the piston 48.

For accommodating the piston 48, the fixation element 24 further includes a bore 62 extending along the longitudinal axis 42 of the device 10. Specifically, the bore 62 extends from the second end 30 of the cylindrical portion 26 to the recess 32 formed at the first end 28 of the cylindrical portion 26 of the fixation element 24 and is configured to receive the piston 48. A diameter of the bore 62 may be less than the diameter of the recess 32 which thus together form a stepped opening within the fixation element 24. Further, the bore 62 includes a variable diameter along the longitudinal axis 42. In other words, a wall of the fixation element 24 has a variable width along the length of the bore 62 such that the diameter of the bore 62 changes along the length of the bore 62. As depicted in FIG. 1, the bore 62 includes a wider portion 64 and a narrower portion 66. At the wider portion 64, a distance between the piston 48 and the wall of the fixation element 24 is greater than at the narrower portion 66.

As shown in FIG. 1, at the narrower portion 66, the piston 48 contacts the wall of the fixation element 24. The narrower portion 66 includes a groove 68 formed in the wall of the fixation element 24 which extends along a perimeter of the bore 62. A first sealing ring 70 is disposed in the groove 68 to form a seal joint between the piston 48 and the fixation element 24. The first sealing ring 70 is positioned between the piston 48 and the wall of the fixation element 24.

The fixation element 24 also includes a plate 72 extending radially from the cylindrical portion 26 of the fixation element 24. The plate 72 is positioned normal to the longitudinal axis 42 and is proximal to the second end 30 of the fixation element 24. The plate 72 is cylindrical in shape and forms a flange portion in proximity to the second end 30 of the fixation element 24.

The fixation element 24 is received at least partly within the support element 40. As set forth above, the fixation element 24 is arranged and adapted to be moved relative to the support element 40 to apply tension to or remove tension from the connecting element 12. The support element 40 includes a first cylindrical portion 74 and a second cylindrical portion 76 connected to one another by a connection portion 78. The first cylindrical portion 74 forms a lower part of the support element 40 to be positioned on the second component 20. Further, the first cylindrical portion 74 surrounds a part of the connecting element 12, the first end 28 of the fixation element 24 and a portion of the cylindrical portion 26 of the fixation element 24. Specifically, the first cylindrical portion 74 surrounds the portion of the cylindrical portion 26 which is positioned underneath the plate 72 in the illustration depicted in FIG. 1.

The second cylindrical portion 74 is spaced away from the first cylindrical portion 74 by the connection portion 78. The second cylindrical portion 76 surrounds the plate 72 of the fixation element 24 such that an inner surface of the second cylindrical portion 76 contacts an outer surface of the plate 72. In other words, the plate 72 is positioned within the second cylindrical portion 76 of the support element 40 and is configured to move relative to the second cylindrical portion 76.

As can be gathered from FIG. 1, the first cylindrical portion 74, the second cylindrical portion 76, and the connection portion 78 are hollow cylindrical portions having inner diameters different from each other, thereby forming stepped configurations with each other. The inner diameter of the connection portion 78 is smaller than the inner diameters of both the first cylindrical portion 74 and the second cylindrical portion 76. The connection portion 78 comprises an opening to guide the fixation element 24 within the support element 40, which opening has a diameter slightly larger than the diameter of the portion of the fixation element 24 guided by the support element 40. The connection portion 78 may further define a recess in which a second sealing ring 79 may be disposed for providing a sealing between the fixation element 24 and the connection portion 78.

Further, a third sealing ring 80 is positioned between the inner surface of the second cylindrical portion 76 and the outer surface of the plate 72 to prevent leakage of the fluid accommodated in the fluid chamber 50. Specifically, the third sealing ring 80 may be positioned in a groove formed either into the inner surface of the second cylindrical portion 76 or into the outer surface of the plate 72, as depicted in FIG. 1.

The plate 72, the connection portion 78, and the second cylindrical portion 76 of the support element 40 together form the effective portion 54 of the fluid chamber 50. The effective portion 54 is fluidly connected to the bore 62 in the fixation element 24 via the connecting bores 56. The effective portion 54 is configured to receive the fluid from the piston portion 52 accommodated in the bore 62 of the fixation element 24 due to an axial movement of the piston 48 slidably positioned within the fixation element 24.

In this way, the fluid may move back and forth between the piston portion 52 and the effective portion 54 of the fluid chamber 50. During operation, the position of the piston 48 determines how much fluid is displaced from the piston portion 52 to the effective portion 54, and vice versa. As can be gathered from FIG. 1, when the piston 48 is moved in an upward direction, i.e. in a direction facing away from the fixation element 24, the size of the piston portion 52 gets smaller. Accordingly, fluid is displaced therefrom into the effective portion 54 causing an increase of pressure in the effective portion 54 as more and more fluid enters thereinto. This pressure acts on the fixation element 24, thereby causing it to move in a direction facing away from the support element 40, i.e. along the longitudinal axis 42. This movement induces tensioning and thus lengthening of the connecting element 12. In this tensioned and lengthened state of the connecting element 12, an operator may tighten the nut 22 so as to position the nut 22 closer to the second component 20, i.e. to abut on the second component 20. This may be performed by reaching the nut 22 through openings in the support element 40 with a tool, an end of which may be inserted into the openings at the side of the nut 22 to turn and thus tighten or loosen the nut 22.

The piston 48 has a rotationally symmetric shape with a head end 82 and a rod end 84 that are distal to one another and connected by a shaft 86. The head end 82 has a sealing portion 88 that is larger in diameter than the shaft 86. The diameter of sealing portion 88 corresponds to a diameter of the bore 62 in the fixation element 24. The sealing portion 88 comprises a recess 90 that is circular in nature. A fourth sealing ring 92 is provided within the recess 90. The first to fourth sealing ring 70, 79, 80, 92 may be made from metal, such as iron or steel, ceramics, fibrous materials, elastomer and/or plastic.

Further, the piston 48 comprises an engagement portion 94 extending from the rod end 84 in direction to the head end 82 of the piston 48. The engagement portion 94 is configured for engagement with the actuating element 46.

In the shown device 10, the actuating element 46 constitutes a user interface intended for being manipulated by the operator to operate the device 10. Accordingly, at a first end, the actuating element 46 comprises an interface element 96 protruding from the fixation element 24 and thus being exposed so as to ensure a good accessibility for the operator. For example, the interface element 96 may be provided with a hexagonal recess for engagement with a tool, i.e. a manual or electric screwdriver, to be used by the operator for actuating the actuating element 46.

Opposed to the interface element end, the actuating element 46 is provided with a first threaded section 98 engaged with the engagement portion 94 of the piston 48 by means of a first threaded connection. Specifically, the engagement portion 94 includes a recess 100 for receiving the first threaded section 96. An inner side wall of the recess 100 is provided with a thread designed complementary to a thread provided on an outer surface of the first threaded section 98.

The actuating element 46 further comprises a second threaded section 102 arranged between the interface element 96 and the first threaded section 98. The second threaded section 102 is engaged with the fixation element 24 by means of a second threaded connection. Specifically, the second threaded section 102 is engaged with a through hole extending through a cap 103 of the fixation element 24, the inner surface of which is provided with a thread designed complementary to a thread provided at an outer surface of the second threaded section 102. The cap 103 is firmly fixed to the second end 30 of the cylindrical portion 26 by means of a threaded connection 104. Alternatively, the cap 103 may be pressed to the second end 30 of the cylindrical portion 26 of the fixation element 24.

In the shown configuration, the first threaded connection provided between the engagement portion 94 and the first threaded section 98 is a right hand threaded connection and the second threaded connection provided between the fixation element 24 and the second threaded section 102 is a left hand threaded connection. Alternatively, the first threaded connection may be a left hand threaded connection and the second threaded connection may be a right hand threaded connection. Further, the first and the second threaded connection may either be a left or a right hand threaded connection. In an alternative configuration, one of the first and the second threaded connection may be replaced by a form-fit connection for enabling a relative rotational movement between the actuating element 46 and the piston 48 or the fixation element 24, while a relative translational movement may be locked.

By such configurations, the actuating unit 44 is configured to transform a rotational movement of the actuating element 46 into a translational movement of the piston 48 which manipulates the volume of the fluid chamber 50 and thereby moves the fixation element 24 with respect to the support element 40. As a result, upon rotationally manipulating the actuation element 46, a tensioning or loosening of the connecting element 12 connected to the fixation element 24 is performed by means of the device 10.

For ensuring tightness of the fluid chamber 50 even for long operating periods of the device 10, it has been found that wear of sealing rings 70 and 92 may be significantly reduced by preventing the piston 48 from being rotated relative to the fixation element 24. Accordingly, the proposed device further comprises a guiding unit 106 intended for guiding the movement of the piston 48 relative to the fixation element 24.

Specifically, the guiding unit 106 is configured for locking a relative rotational movement between the piston 48 and the fixation element 24, while it allows the piston 48 to be translationally moved relative to the fixation element 24 along its longitudinal axis 42. In other words the guiding unit 106 is configured to prevent the piston 48 from being subjected to a rotational movement relative to the fixation element 24, i.e. around the longitudinal axis 42. In the shown configuration, the longitudinal axis 42 of the piston 48, the fixation element 24 and the device 10 coincide.

In the context of the present disclosure, a connection may be described as locking a relative movement between components even though a minimal or negligible small movement, i.e. back and forth movement, may be released. Specifically, a connection may be described as locking a rotational movement when it restricts a relative rotational movement to less than 5° or less than 1° between the connected components. In the shown configuration, the guiding unit 106 is configured to restrict a rotational movement between the piston 48 and the fixation element 24 to less than 1°.

Figure 2:
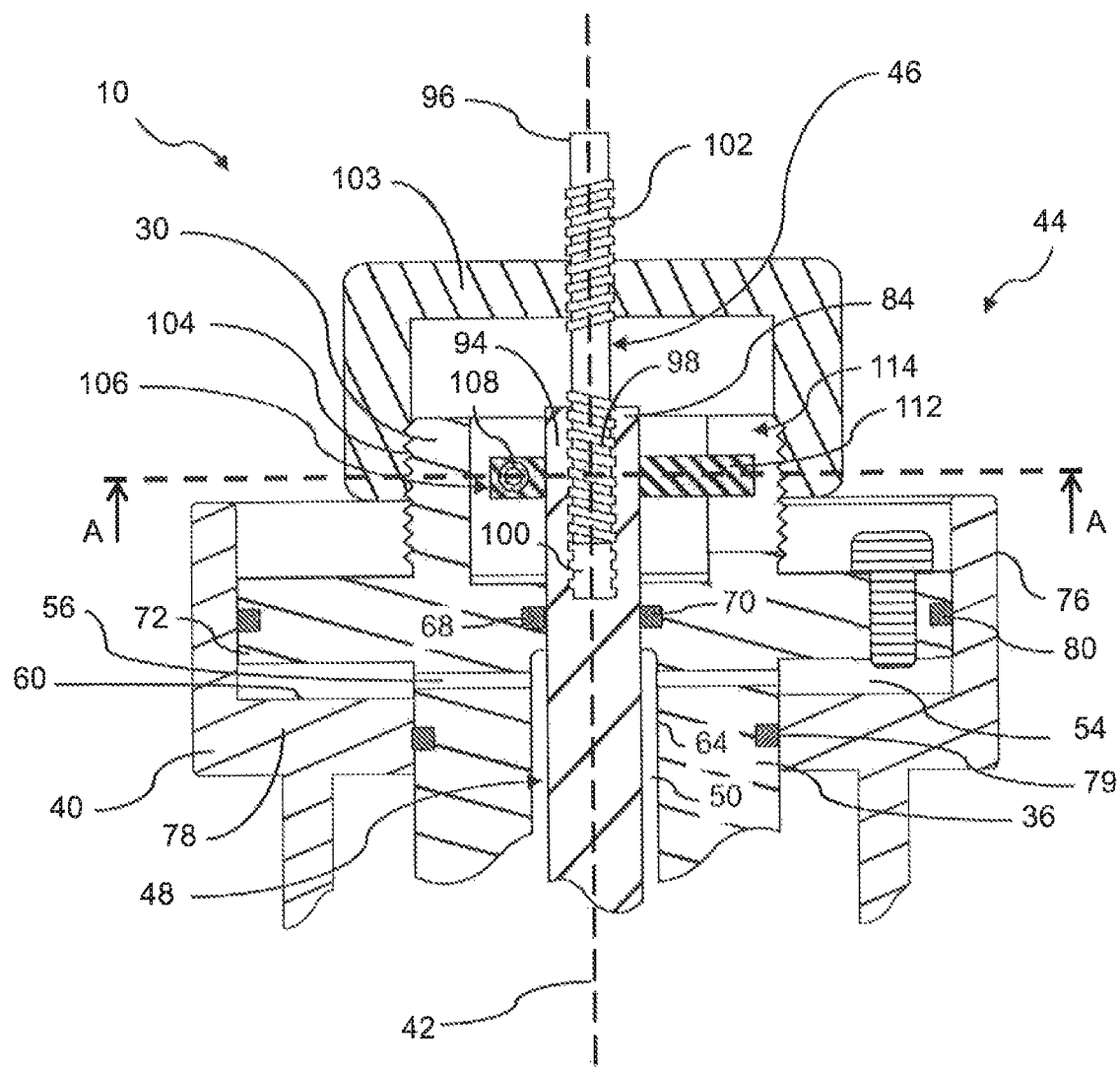

The guiding unit 106 is arranged outside of the fluid chamber 50. In the illustration depicted in FIGS. 1 and 2, the guiding unit 106 is positioned above the fluid chamber 50, in particular above the first sealing ring 70 which delimits the fluid chamber 50 from top, during operation of the device 10. Specifically, the guiding unit 106 is arranged at the engagement section 94 and thus in the region of the rod end 84 of the piston 48.

In the shown configuration, the guiding unit 106 is formed by a separate component of the device 10. In this context, the term "separate component" means that the guiding unit together with the piston or the fixation element does not form an integral component, i.e. manufactured by molding or forming methods. According to an alternative configuration, the guiding unit 106 may be formed integrally with the piston or the fixation element. In other words, the guiding unit 106 may be constituted or formed by an integral part of the piston 48 or the fixation element 24.

Figure 3:
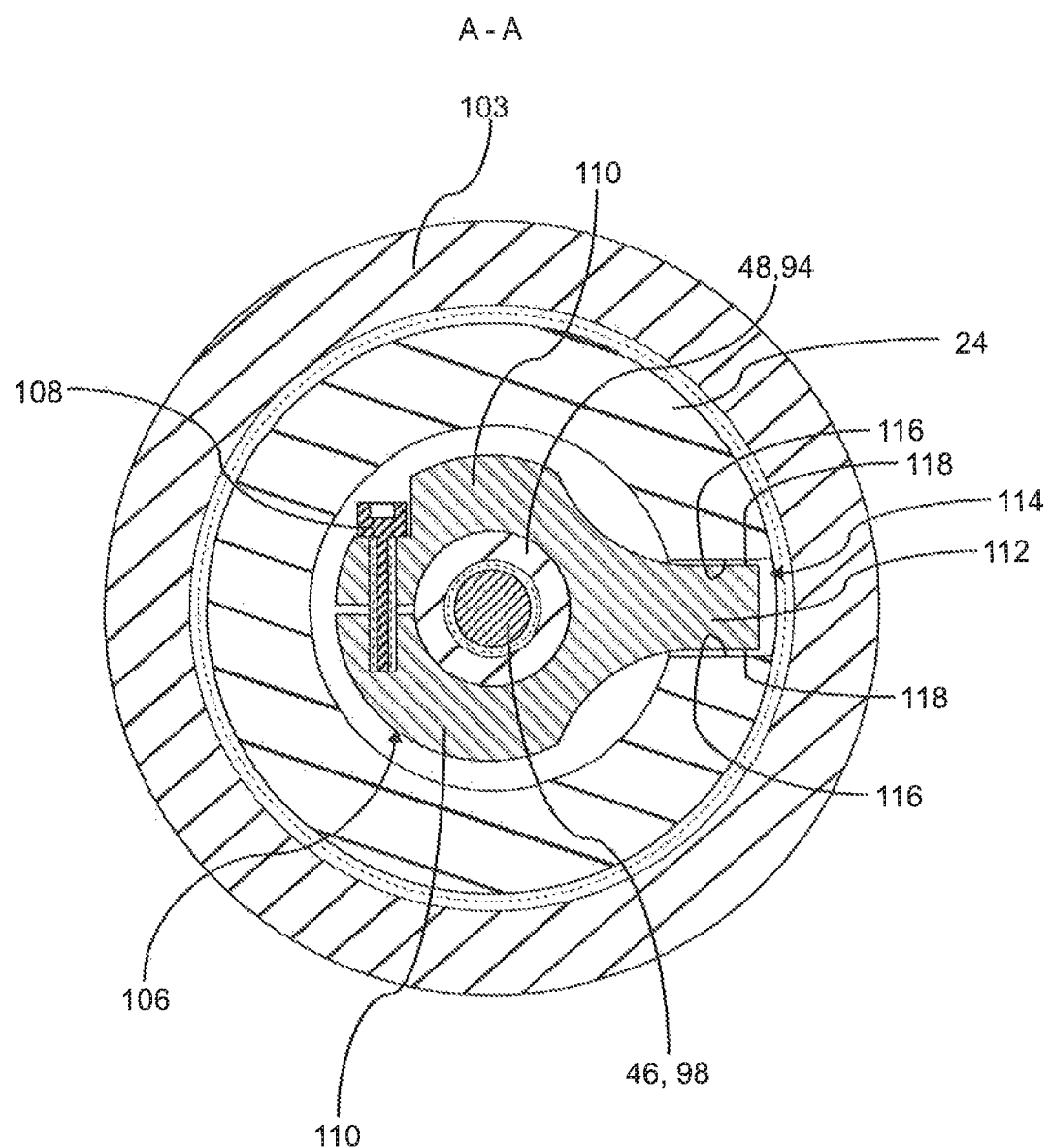
FIG. 3 schematically shows a cross-sectional view of the guiding unit along the section plane A-A depicted in FIG. 2 according to a first configuration.

As can be gathered from FIG. 3, the guiding unit 106 is provided in the form of a guiding sleeve having a through hole, through which the engagement portion 94 of the piston 48 extends. Specifically, the guiding unit 106 is releasably mounted to the piston 48 in a torque- and force-transmitting manner. In other words, the guiding unit 106 is firmly fixed to the engagement portion 94. In this context, the term "firmly fixed" means that the connection between the guiding unit 106 and the engagement portion 94 does not provide for any free movement or free rotation therebetween. For doing so, a clamping screw 108 is provided for force-fittingly connecting the guiding unit 106 to the piston 48. Alternatively, the guiding unit 106 may be form-fittingly connected to the piston 48 such that at least a rotational movement between the guiding unit 106 and the piston 48 is locked.

The guiding unit 106 comprises two clamping arms 110 forming the through hole for receiving the engagement portion 94 of the piston 48. In other words, the engagement portion 94 of the piston 48 is arranged between the clamping arms 110. In this configuration, the clamping screw 108 extends through an end portion of each clamping arm 110 and is configured to, upon being tightened or screwed, pull together the two clamping arms 110 so as to force-fittingly connect the guiding unit to the piston 48. For doing so, the clamping screw 108 is connected to the end portion of each one of the clamping arms 110 by means of a threaded connection.

Further, the guiding unit 106 comprises a guiding element 112 in the form of a sliding protrusion which is engaged with and designed complementary to a guiding rail 114 provided in the fixation element 24. The guiding rail 114 is provided in the form of a guiding recess which extends over the whole width of a side wall of the fixation element 24 and along the movement direction of the piston 48 relative to the fixation element 24. Particularly, for guiding the translational movement of the piston 48 relative to the fixation element 24, the guiding rail 114 extends parallel to the movement direction of the piston 48 relative to the fixation element 24 and thus parallel to the longitudinal axis 42 of the piston 48. The guiding element 112 protrudes into the guiding rail 114 such that it is interposed between two guiding surfaces 116 of the guiding rail 114. In this way, the guiding unit 106 is engaged with the fixation element 24 in a form-fitting manner such that a rotational movement between the guiding unit 106 and the fixation element 24 around the longitudinal axis 42 of the piston 48 is locked.

Accordingly, the guiding element 112 comprises two opposed sliding surfaces 118 which are engaged with the two opposed guiding surfaces 116 of the guiding rail 114. In other words, the sliding surfaces 118 are movable relative to and along the guiding surfaces 116. The sliding surfaces 116 and the guiding surfaces 118 are provided such that they form-fittingly lock the rotational movement of the guiding unit 108 and thus of the piston 48 relative to the fixation element 24 around the longitudinal axis 42 of the piston 48. For doing so, the guiding surfaces 116 extend parallel to the longitudinal axis 42, i.e. the movement direction of the piston 48 relative to the fixation element. Further, a surface normal of the guiding surfaces 116 and the longitudinal axis 42 are linearly independent. In this context, the surface normal may refer a vector arranged perpendicular to the guiding surface 116, wherein the longitudinal axis 42 points in movement direction of the piston 48 relative to the fixation element.

Figure 4:
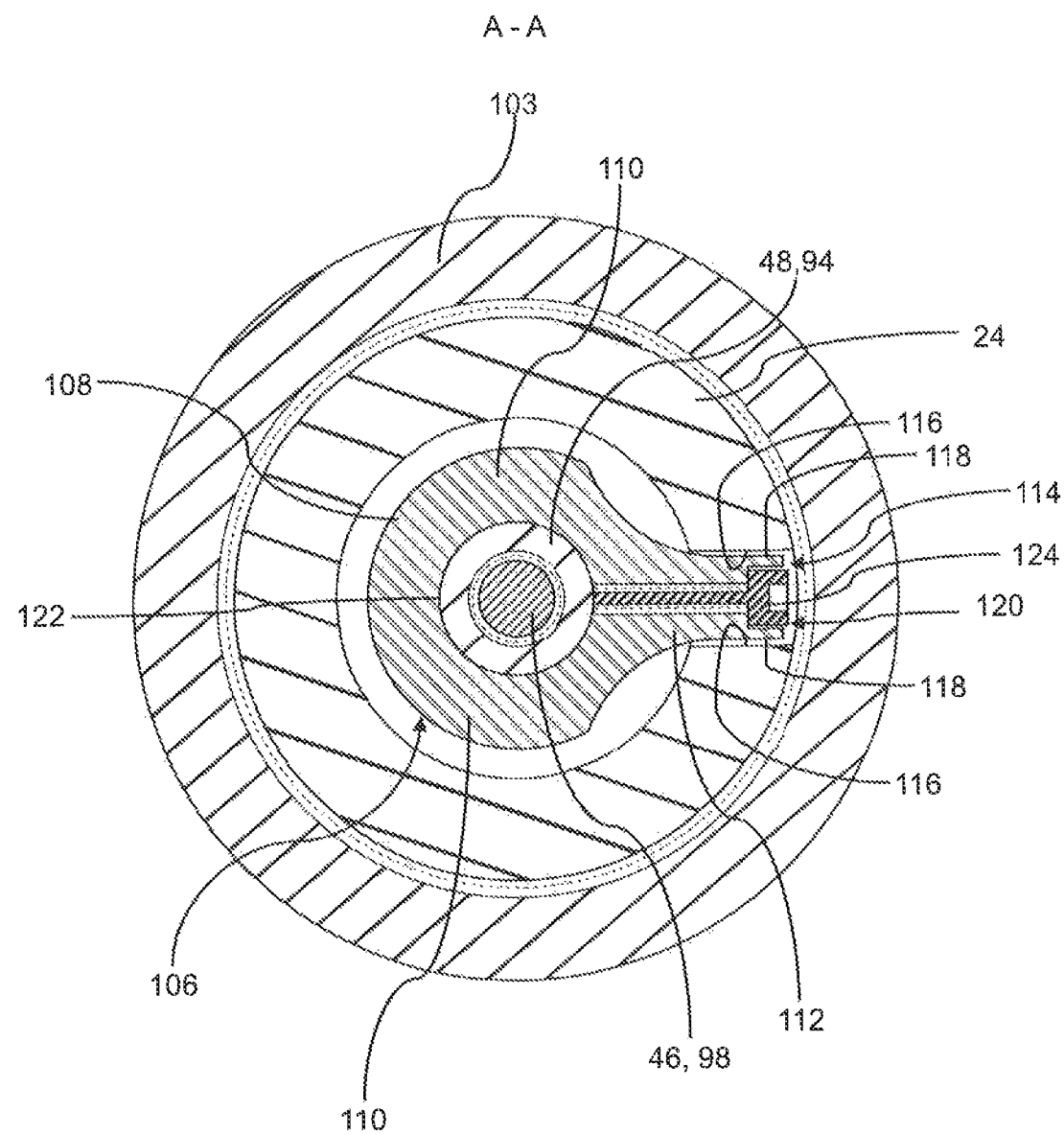
FIG. 4 schematically shows a cross-sectional view of the guiding unit along the section plane A-A according to a second configuration.

FIG. 4 shows an alternative configuration of the guiding unit 106 having a clamping screw 120 for force-fittingly connecting the guiding unit 106 to the engagement portion 94 of the piston 48. The clamping screw 120 is configured to, upon being tightened, press the piston 48, i.e. its engagement portion 94, against a side wall 122 of the guiding unit 106 so as to force-fittingly connect the engagement portion 94 of the piston 48 to the guiding unit 106. Specifically, the clamping screw 120 extends through the guiding element 112 such that a head portion 124 of the clamping screw 120 is arranged at an end surface of the guiding element 112.

Figure 5:
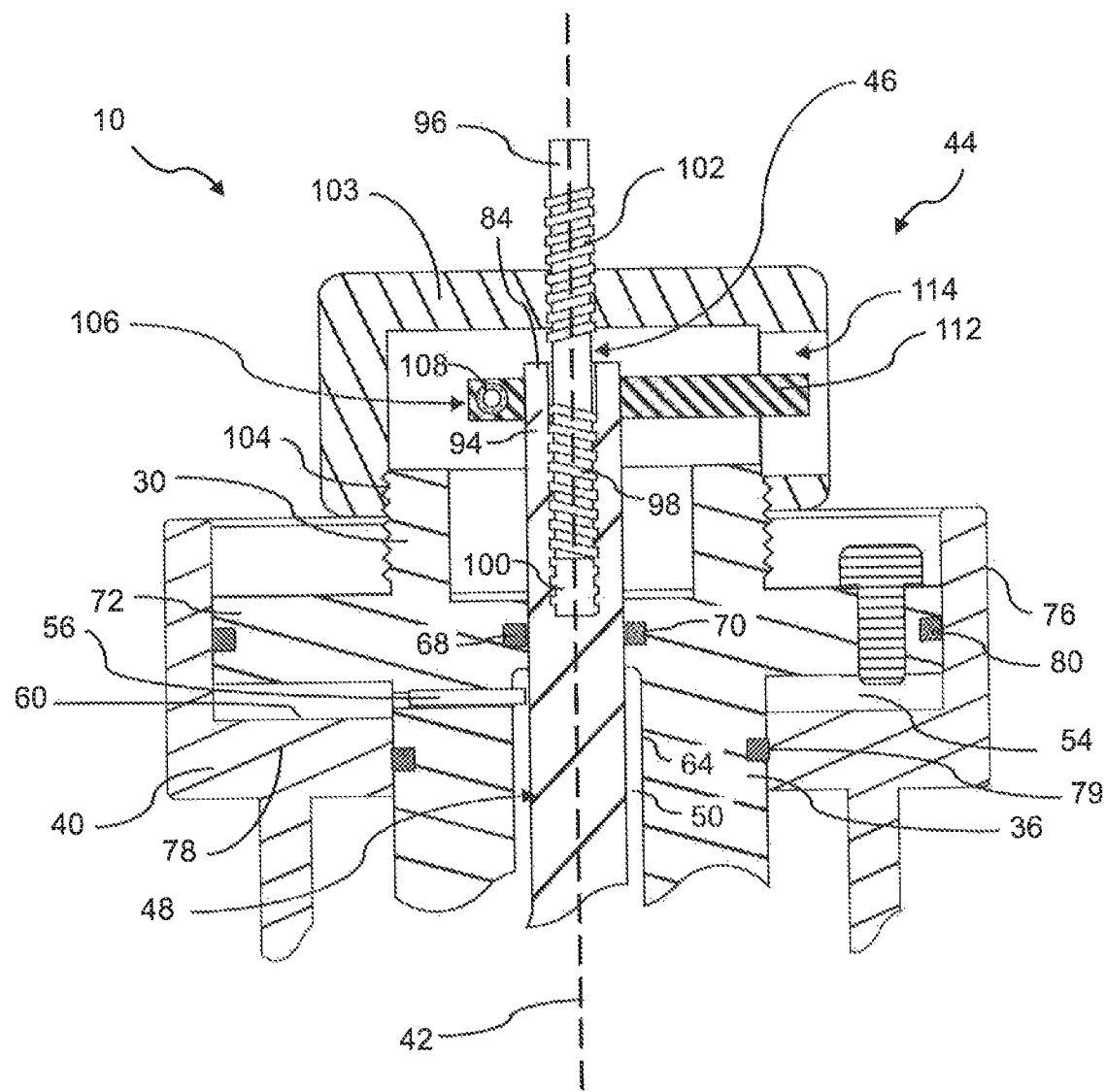
FIG. 5 schematically shows an enlarged sectional view of a device for tensioning a connecting element according to another embodiment.

FIG. 5 shows another embodiment of the device 10 for tensioning a connecting element 12. Compared to the configurations depicted in FIGS. 1 to 4, the guiding rail 114 is provided in the cap 103. Alternatively, the guiding rail 114 may be provided in the cap 103 and in the second end 30 of the fixation element 24. In this way, the end surface of the guiding element 112 is exposed and thus visible for an operator. The position of the guiding element 112 within the guiding rail 114 indicates a position of the piston 48 relative to the fixation element 24. In other words, the operator receives visual feedback as regards the position of the piston 48 within the fixation element 24. Further, in case the guiding unit 110 comprises a clamping screw 120 protruding through the guiding element 112 according to the configuration of the guiding unit 106 depicted in FIG. 4, an operator may easily release the connection between the guiding unit 106 and the engagement portion 94 of the piston 48. Accordingly, an assembly or disassembly and thus the maintainability of the device 10 may be simplified for an operator.

In the shown configurations, the guiding unit 106 is firmly fixed to the engagement portion 94 of the piston 48. Alternatively, the guiding unit may be releasably mounted to the fixation element in a form- and/or force-fitting manner such that at least a rotational movement between the fixation element and the guiding element is locked. For example, the guiding unit may be firmly fixed to the fixation element in a force-fitting manner by means of a clamping screw. In this configuration, the guiding unit may further be engaged with the piston, i.e. its engagement portion, in a form-fitting manner such that likewise a rotational movement between the piston and the guiding element is locked. Accordingly, the piston may be provided with the guiding rail.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

This is in particular the case with respect to the following optional features which may be combined with some or all embodiments, items and/or features mentioned before in any technically feasible combination.

A device may be provided for tensioning a connecting element fastened to a component to be tightened. The device may comprise a fixation element for receiving and holding the connecting element, a support element for supporting the device against the component, and an actuating unit with a fluid chamber and a piston. The fluid chamber may be configured for receiving a fluid. The piston may be translationally guided within the fixation element. The actuating unit may be configured for manipulating a volume of the fluid chamber by translationally actuating the piston so as to move the fixation element relative to the support element. The device may further comprise a guiding unit for locking a relative rotational movement between the piston and the fixation element, wherein the guiding unit may be arranged outside of the fluid chamber.

By being provided with the guiding unit, the device restricts or prevents the piston from being rotated relative to the fixation element accommodating the piston. As a result, the device is less affected by wear. In this way, the durability of the piston and the fixation element, i.e. a sealing arranged therebetween, may be significantly increased.

Further, by arranging the guiding unit outside of the fluid chamber, its accessibility for an operator may be improved, thereby simplifying the assembly and disassembly and thus the maintainability of the device, i.e. the actuating unit. To that end, compared to known configurations, in which a guiding unit is arranged within the fluid chamber, the volume of the fluid chamber and thus the amount of fluid accommodated therein may be reduced. Usually, during tensioning operation of the device, the fluid present in the fluid chamber is exerted to high pressure causing a compression of the fluid. The fluid thus stores mechanical energy which poses a hazard potential. With increasing the amount of fluid present in the fluid chamber, the hazard potential induced by fluid compression also increases. Thus, by reducing the amount and volume of fluid present in the fluid chamber, the operational safety of the proposed device for an operator may be increased.

Generally, the proposed device may be used, for example, in the field of steel constructions and various engine design applications, but is not limited to these applications. Rather, the proposed device may be used in any application in which connecting elements are tightened by employing torque-free tensioning methods. In one example, the proposed device may be used to fasten a turbo charger to an engine crank case.

Specifically, the device may be used for tensioning and/or loosening a connecting element. In other words, the device may be used to preload and/or untighten a connecting element. The connecting element may be a tensable connecting element. For example, the connecting element may be or comprise a screw, a bolt and/or any other type of tensable connecting elements.

Further, the connecting element to be tensioned and/or loosened by the proposed device may be intended and/or configured to tighten a component to which it is fastened. Alternatively or additionally, the connecting element to be tensioned and/or loosened by the proposed device may be intended and/or configured for connecting, i.e. form- and/or force-fittingly connecting, a first component to a second component. Accordingly, the device may be configured for tensioning a connecting element for connecting a first component to a second component. For doing so, a first end of the connecting element may be fixed to the first component, i.e. by means of a threaded engagement. For example, the first component may be an engine crank case and the second element may be a turbo charger mount.

As set forth above, the device may comprise the fixation element connectable to the connecting element. In other words, the fixation element may be configured for being connected to the connecting element, i.e. in a force- and/or form-fitting manner. For doing so, the fixation element may comprise a fixation section for engaging with the connecting element, in particular in a force- and/or form-fitting manner. Specifically, the fixation section may be engaged with the connecting element by means of a threaded connection. The fixation section may be provided at an end portion of the fixation element. Further, the fixation section may be configured to engage with a second end of the connecting element arranged opposed to the first end thereof. For example, the fixation section may be provided with a thread designed complementary to a thread formed at the second end of the connecting element.

More specifically, the fixation element may be provided with a recess, i.e. a cylindrical recess, which forms the fixation section. The recess may be provided at a front end of the fixation element. The fixation section may comprise at least one side wall formed by the recess which is connectable to the connecting element in a force- and/or form-fitting manner. For example, the at least one side wall of the recess may be provided such that it includes internal threads formed on an inner surface to engage with complementary threads formed at the second end of the connecting element.

As set forth above, the device may comprise the support element configured to support the fixation element against the component to be tightened. In other words, the support element is configured to, during the tensioning operation of the device, abut on the component to be tightened, i.e. on the first or the second component. In this way, the support element is capable of generating a force, i.e. a reaction force, counteracting the pulling force exerted onto the connecting element connected to the fixation element during tensioning operation of the device.

The support element may be designed to translationally guide the fixation element. In other words, the fixation element may be translationally movable relative to the support element, i.e. along a longitudinal axis of the device, and thus relative to the component to be tightened.

Upon translationally moving the fixation element relative to the support element, a tensioning force may be applied to or may be removed from the connecting element fixed to the fixation element. Thus, the device may be provided such that the fixation element is translationally movable relative to the support element so as to apply a tension to or to remove a tension from the connecting element.

The device may be provided such that the fixation element, at least partly, is accommodated within the support element. For example, the support element may be provided with a cavity, i.e. a cylindrical cavity which particularly extends along the longitudinal axis of the device. The cavity may be configured to at least partially receive the fixation element, i.e. the fixation section thereof.

A set forth above, the device may further comprise the actuating unit for actuating the fixation element relative to the support element. Specifically, the actuating unit may be configured for translationally moving the fixation element relative to the support element and thus relative to the component to be tightened.

The actuating unit may be a hydraulic actuating unit. This means that the actuating unit may use a fluid for actuating the fixation element. In other words, a fluid is used to transfer motive power for the fixation element so as to move the fixation element relative to the component to be tightened and thus relative to the support element. For doing so, the actuating unit may comprise the fluid chamber for receiving the fluid, which may be a hydraulic fluid.

As set forth above, the actuating unit is configured to manipulate the volume of the fluid chamber so as to move the fixation element relative to the support element. For manipulating the volume of the fluid chamber, the actuating unit may comprise an actuating means for applying pressure to and/or releasing pressure from the fluid accommodated in the fluid chamber.

The actuating unit may comprise the piston which is accommodated within and movable relative to the fixation element and which partially defines the fluid chamber. The fluid chamber may be further defined or delimited at least partly by the fixation element and/or the support element. In other words, the fluid chamber may at least partly be provided in a space between the piston and/or the fixation element and/or the support element. Further, the fluid chamber may extend to and be delimited by seals, i.e. sealing rings, provided between the piston and/or the fixation element and/or the support element.

The actuating unit may be provided such that a translational movement of the piston manipulates a volume of the fluid chamber and thereby moves the fixation element with respect to the support element and thus with respect to the component to be tightened. For actuating the piston, the actuating unit may comprise an actuating element which may be actuated by the operator, i.e. by hand or by means of an electric or manual screwdriver. Thus, the actuating element may constitute a user interface for receiving an input force or torque so as to operate the device. For example, the actuating element may be provided with an interface element intended for receiving the input torque exerted by an operator. The interface element may be provided at an end portion of the actuating element and may protrude from an outer surface of the device so as to ensure good accessibility for the operator.

Specifically, the interface element may be designed and intended to be manually operated by the operator, i.e. by hand. Accordingly, the interface element may be provided in the form of a handle ensuring a good grasp. For improving the operability of the device for a user, the handle may have a diameter greater compared to a shaft portion of the actuating element arranged adjacent to the interface element. Alternatively, the interface element may be designed and intended for engagement with a tool, i.e. an electric or manual screwdriver.

For example, the actuating unit may be configured for translating a rotational movement applied to the actuating element into a translational movement of the fixation element relative to the component to be tightened and thus relative to the support element. In other words, in the actuating unit, the actuating element and the piston may be arranged and interlinked to one another such that a rotational movement of the actuating element causes a translational movement of the piston, i.e. along the device's longitudinal axis, which manipulates the volume of the fluid chamber and thereby moves the fixation element relative to the component. One example of interlinking the actuating element and the piston is given by FIG. 1 and its accompanying description.

The piston may be provided with a head end and a rod end arranged opposed to each other. During tensioning operation of the device, the head end may be accommodated within a cavity of the fixation element forming the fluid chamber, while the rod end may be disposed outside of the cavity. The piston further comprises an engagement portion which is engaged with the actuating element of the actuating unit. Specifically, the engagement portion may be provided at or in the region of the rod end of the piston. Further, the engagement portion may be connected to the actuating element in a form- and/or force-fitting manner. An end portion of the actuating element, which may be arranged opposed to the interface element thereof, may be engaged with the engagement portion of the piston. For example, the end portion of the actuating element may be received within a recess provided at the rod end of the piston and be engaged thereto, i.e. by means of a threaded connection. In this configuration, the inner surface of the recess may be provided with a thread designed complementary to a thread formed at an outer surface of the end portion of the actuating element. Alternatively, the end portion of the actuating element may be provided with a recess engaged with the engagement portion or the rod end of the piston, i.e. by means of a threaded connection. For example, an inner surface of the recess may be provided with a thread designed complementary to a thread formed at an outer surface of the engagement portion or rod end of the piston.

The device, as set forth above, may further comprise the guiding unit for guiding the movement of the piston relative to the fixation element. Specifically, the guiding unit may be configured to allow the piston to be translationally moved relative to the fixation element, while the rotational movement of the piston relative to the fixation element is locked. In other words, the guiding unit is configured to prevent the piston from being subjected to a rotational movement relative to the fixation element.

The guiding unit is arranged outside from the fluid chamber. In other words, the guiding unit is provided such that, during tensioning operation of the device, it does not extend into the fluid chamber. Generally, the fluid chamber may be delimited by the piston and/or the fixation element and/or the support element and the seals, i.e. sealing rings, provided therebetween. Accordingly, the device may be provided such that, during tensioning operation of the device, the guiding unit does not contact or extend beyond seals delimiting the fluid chamber, i.e. arranged between the piston and the fixation element.

Specifically, for avoiding that the guiding unit extends into the fluid chamber or contacts the seal delimiting the fluid chamber, the guiding unit may be provided at or in the region of an end section of the piston. For example, the guiding unit may be provided at or in the region of the rod end of the piston. Further, the guiding unit may be provided at or in the region of the engagement portion of the piston.

In a further development, the guiding unit may be constituted or formed by a part, i.e. an integral part, of the piston and/or the fixation element. In the context of the present disclosure, the term "integral part" refers to a part of a component manufactured by molding or forming methods. In other words, according to this configuration, the function of the guiding unit may be implemented without increasing the overall number of components of the device.

For example, a part, i.e. an integral part, of the piston may constitute or form the guiding unit which may be connected to the fixation element in a form-fitting manner such that a relative translational movement between piston and the fixation element, i.e. along the movement direction of the piston relative to the fixation element, is released and a relative rotational movement, i.e. around the longitudinal axis of the piston, is locked.

Alternatively, a part, i.e. an integral part, of the fixation element may constitute or form the guiding unit which may be connected to the piston in a form-fitting manner such that a relative translational movement between the piston and the fixation element, i.e. along the movement direction of the piston relative to the fixation element, is released and a relative rotational movement, i.e. around the longitudinal axis of the piston, is locked.

In a further development, the guiding unit may be formed by a separate component of the device which may be engaged with both the piston and the fixation element. In this configuration, the guiding unit may be configured to be mounted to one of the piston and the fixation element such that a connection therebetween locks at least a relative rotational movement around the longitudinal axis of the piston. For example, the guiding unit may be configured to be firmly fixed to one of the piston and the fixation element. Thus, the connection between the guiding element and the piston or the fixation element does not provide for any free movement or free rotation therebetween. In this configuration, the guiding unit may be further configured to be engaged with the other one of the piston and the fixation element such that a relative rotational movement, i.e. around the longitudinal axis of the piston, between the guiding unit and the other one of the piston and the fixation element is locked.

For example, according to a first configuration, the guiding unit may be releasably mounted to the fixation element in a force- and/or form-fitting manner such that a relative rotational movement between the guiding unit and the fixation element, i.e. around the longitudinal axis of the piston, is locked. In this way, the connection between the guiding unit and the fixation element restricts or prevents the guiding unit from being rotated relative to the fixation element, i.e. around the longitudinal axis of the piston. Further, the guiding unit may be engaged with the piston in a form-fitting manner such that a relative translational movement between the guiding unit and the piston, i.e. along the movement direction of the piston relative to the fixation element, is released and a relative rotational movement between the guiding unit and the piston, i.e. around the longitudinal axis of the piston, is locked.

According to a second configuration, the guiding unit may be releasably mounted to the piston in a force- and/or form-fitting manner such that a relative rotational movement between the guiding unit and the piston, i.e. around a longitudinal axis of the piston, is locked. In this way, the connection between the guiding unit and the piston restricts or prevents the guiding unit from being rotated relative to the piston, i.e. around the longitudinal axis of the piston. Further, the guiding unit may be engaged with the fixation element in a form-fitting manner such that a relative translational movement between the guiding unit and the fixation element, i.e. along the movement direction of the piston relative to the fixation element, is released and a relative rotational movement between the guiding unit and the fixation element, i.e. around the longitudinal axis of the piston, is locked. In this way, the connection between the guiding unit and the fixation element enables a translational movement of the guiding unit and thus of the piston relative to the fixation element, i.e. along the movement direction of the piston relative to the fixation element.

In a further development, the guiding unit may comprise a guiding element, i.e. a sliding protrusion, designed complementary to and engaged with a guiding rail, particularly a guiding recess, provided in the fixation element or the piston. The guiding element and the guiding rail may constitute a bearing for the piston for guiding its movement relative to the fixation element.

The guiding rail may extend in direction of and/or parallel to a movement direction of the piston relative to the fixation element. In movement direction of the piston relative to the fixation element, a length of the guiding rail may be greater compared to a length of the guiding element.

The guiding rail may be provided with at least one guiding surface extending in direction of and parallel to the movement direction of the piston relative to the fixation element. Accordingly, the guiding element may be provided with a sliding surface which may contact the guiding surface and which may be moved relative to and along the guiding surface in the movement direction of the piston relative to the fixation element. In the context of the present disclosure, the term "guiding surface" refers to a part of a surface of the guiding rail which, upon translationally actuating the piston, contacts the sliding surface of the guiding element. Further, the guiding surface and the sliding surface may be provided such that they form-fittingly lock a rotational movement of the piston relative to the fixation element about the longitudinal axis of the piston, which in particular coincides with the movement direction of the piston relative to the fixation element. Specifically, for doing so, the sliding surface may be provided such that it extends parallel to the longitudinal axis of the piston, i.e. the movement direction of the piston relative to the fixation element, and such that a surface normal thereof and the longitudinal axis of the piston, i.e. the movement direction of the piston relative to the fixation element, are linearly independent or skew. In other words, the surface normal of the sliding surface may be perpendicular to the longitudinal axis of the piston, but not cross the longitudinal axis of the piston. For example, the sliding surface, in movement direction of the piston relative to the fixation element, may have a closed cross-sectional contour with a non-circular shape.

In a further development, the guiding unit may be provided with a recess, i.e. a through hole, designed and configured for receiving the piston, i.e. its engagement portion. For example, the guiding unit may be provided in the form of a sleeve for partially accommodating the piston.

Further, the guiding unit may comprise a clamping screw for force-fittingly mounting the guiding unit to the piston or to the fixation element. In this way, the guiding unit may be releasably mounted within the device.

For example, for force-fittingly mounting the guiding unit to the piston, the clamping screw may be configured to, upon being tightened, pull together two clamping arms of the guiding unit, between which the piston, i.e. its engagement portion, may be arranged. In this configuration, the clamping screw may extend through an end portion of each clamping arm.

Alternatively, for force-fittingly mounting the guiding unit to the piston, the clamping screw may be configured to, upon being tightened, press the piston, i.e. its engagement section, against a side wall of the guiding unit. In this configuration, the clamping screw may extend through the guiding element of the guiding unit. Specifically, a head portion of the clamping screw may protrude from an end surface of the guiding element. By this configuration, the head of the clamping screw may be arranged in or protrude from the guiding recess, thereby ensuring a good accessibility thereof for an operated.

INDUSTRIAL APPLICABILITY

The proposed device 10 may be used for fastening and/or loosening a tensable connecting element 12 to components to be tightened. The device 10 may be used in different fields of application, such as in steel constructions or engine design applications. In the following, the use of the device 10 for tightening and loosening a screw connection is described in more detail.

To connect a first component 18, e.g. a crank case, to a second component 20, e.g. a turbo charger mount, using a device 10 as shown in FIG. 1, the second component 20 is positioned next to the first component 18 and a connecting element 12 in the form of a screw is guided through a hole in the second component 20 and connected to the first component 18 by means of a threaded connection. As a result, the connecting element 12 extends from a side of the second component 20 which faces away from the first component 18. A nut 22 is screwed on the connecting element 12 from a first end 14 of the connecting element 12 which is arrange opposite to a second end 16 of the connecting element 12 positioned in and fastened to the first component 18.

Then, the device 10 is positioned over the connecting element 12 such that the connecting element 12 is housed by the support element 40. The support element 40 is placed on the second component 20. The fixation element 24 is positioned to introduce the connecting element 12 into the recess 32 to establish a threaded connection between the fixation element 24 and the first end 14 of the connecting element 12.

To apply a tension force to the connecting element 12, the actuating element 46 is rotationally actuated by using an electric or manual screwdriver. In this way, the piston 48 is translationally actuated relative to the fixation element 24 in a direction facing away from the second component 20. By moving the piston 48 in this direction, i.e. upwards, the piston portion 52 of the fluid chamber 50 decreases and hydraulic fluid is pushed therefrom into the effective portion 54 of the fluid chamber 50 via the connecting bores 56. As a result, the effective portion 54 increases in volume thereby exerting a pressure on the fixation element 24 which moves the same along the longitudinal axis 42 of the device 10 in respect to the support element 40. Accordingly, a distance between the fixation element 24 and the first and the second component 18, 20 increases, thereby tensioning and thus lengthening the connecting element 12.

In this tensioned condition of connecting element 12, for retaining the tension on the connecting element 12, the nut 22 is further tightened on the connecting element until the nut 22 abuts on the second component 20. This is performed by reaching through openings in the support element 40 with a tool, like a stick which end may be inserted in openings at the side of the nut 22 to turn the nut 22 on the connecting element 12 from the side.

For loosening a screw connection formed by the connecting element 12 and the nut 22, which was fastened by device 10 as described above, the support element 40 is positioned around the connecting element 12 on the second component 20. The exposed first end 14 of the connecting element 12 is fixed to the fixation element 24 by introducing the first end 14 of the connecting element in the recess 32 of the fixation element and connecting the first end 14 of the connecting element 12 with the fixation element 24 by a threaded engagement by means of complementary threads formed at the recess 32 of the fixation element 24 and the first end 14 of the connecting element 12.

To apply a tension force to the connecting element 12, the actuating element 46 is rotationally actuated by using an electric or manual screwdriver. As a result, the piston 48 is translationally actuated relative to the fixation element 24 in a direction facing away from the second component 20. By moving the piston 48 in this direction, i.e. upwards, the piston portion 52 of the fluid chamber 50 decreases and hydraulic fluid is pushed therefrom into the effective portion 54 of the fluid chamber 50 via the connecting bores 56. As a result, the effective portion 54 increases in volume thereby exerting a pressure on the fixation element 24 which moves the same along the longitudinal axis 42 of the device 10 in respect to the support element 40. Accordingly, a distance between the fixation element 24 and the first and the second component 18, 20 increases, thereby tensioning and thus lengthening the connecting element 12.

In a further step, the nut 22 positioned on the connecting element 12 is loosened using a tool reaching through an opening in the support element 40. After loosening the nut 22, the tension force applied to the connection element 12 is removed by rotationally actuating the actuating element 46 in a direction that is reversed compared to the rotational actuation of the same for generating the tension force as described above. As a result, the piston 48 is moved towards the second component 20, thereby increasing the piston portion 52 of the fluid chamber 50. Further, the effective portion 54 of the fluid chamber 50 decreases and the fixation element 24 moves towards the second component 20 and release the tension acting on the connecting element 12. Thereafter, the connecting element 12 is released from the fixation element 24, thereby removing the device 10 from the connecting element 12 and the first and second component 18, 20.

The invention claimed is:

1. A device for tensioning a connecting element fastened to a component to be tightened, comprising:
   a fixation element for receiving and holding the connecting element;
   a support element for supporting the device against the component;
   an actuating unit with a fluid chamber for receiving a fluid and a piston which is translationally guided in the fixation element, wherein the actuating unit is configured for manipulating a volume of the fluid chamber by translationally actuating the piston so as to move the fixation element relative to the support element; and
   a guiding unit for locking a relative rotational movement between the piston and the fixation element,
   characterized in that the guiding unit is arranged outside of the fluid chamber.

2. The device according to claim 1, wherein the actuating unit further comprises an actuating element which is engaged with an engagement portion of the piston, and wherein the guiding unit is arranged at or in the region of the engagement portion of the piston.

3. The device according to claim 2, wherein the actuating unit is configured to transform a rotational movement of the actuating element in a translational movement of the piston.

4. The device according to claim 1, wherein the guiding unit is arranged at or in the region of an end section of the piston.

5. The device according to claim 1, wherein the guiding unit is releasably mounted to the piston in a force- and/or form-fitting manner and is engaged with the fixation element in a form-fitting manner.

6. The device according to claim 1, wherein the guiding unit is releasably mounted to the fixation element in a force- and/or form-fitting manner and is engaged with the piston in a form-fitting manner.

7. The device according to claim 1, wherein the guiding unit comprises a guiding element designed complementary to and engaged with a guiding rail provided in the fixation element or the piston, wherein the guiding rail extends parallel to a movement direction of the piston relative to the fixation element.

8. The device according to claim 7, wherein the guiding element comprises a sliding surface which is engaged with and movable relative to a guiding surface of the guiding rail, wherein the sliding surface and the guiding surface are provided such that they form-fittingly lock a relative rotational movement between the piston and the fixation element.

9. The device according to claim 8, wherein the guiding surface extends parallel to the movement direction of the piston relative to the fixation element, and wherein a surface normal of the guiding surface and the movement direction of the piston relative to the fixation element are linearly independent.

10. The device according to claim 1, wherein the guiding unit is provided with a recess for receiving the piston.

11. The device according to claim 1, wherein the guiding unit comprises a clamping screw for force-fittingly mounting the guiding unit to the piston or the fixation element.

12. The device according to claim 11, wherein the clamping screw is configured to, upon being tightened, pull together two clamping arms of the guiding unit so as to force-fittingly connect the guiding unit to the piston arranged between the clamping arms, wherein in particular the clamping screw extends through an end portion of each clamping arm.

13. The device according to claim 11, wherein the clamping screw is configured to, upon being tightened, press the piston against a side wall of the guiding unit so as to force-fittingly connect the piston to the guiding unit.

14. The device according to claim 13, wherein the clamping screw extends through the guiding element such that a head portion of the clamping screw is arranged at an end surface of the guiding element.

* * * * *